(12) United States Patent
Nakada et al.

(10) Patent No.: US 8,207,680 B2
(45) Date of Patent: Jun. 26, 2012

(54) DISCHARGE LAMP BALLAST HAVING AN AUTO-TRANSFORMER FOR HIGH VOLTAGE DETECTION

(75) Inventors: Katsuyoshi Nakada, Kyoto (JP); Tomoyuki Nakano, Sakai (JP); Junichi Hasegawa, Osaka (JP); Koji Watanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 271 days.

(21) Appl. No.: 12/625,632

(22) Filed: Nov. 25, 2009

(65) Prior Publication Data

US 2010/0176737 A1 Jul. 15, 2010

(30) Foreign Application Priority Data

Nov. 25, 2008 (JP) .................................. 2008-300155

(51) Int. Cl.
*G05F 1/00* (2006.01)
(52) U.S. Cl. ........ 315/291; 315/307; 315/247; 315/278; 315/209 R
(58) Field of Classification Search .................. 315/247, 315/224, 225, 276–280, 291, 307–311
See application file for complete search history.

(56) References Cited

FOREIGN PATENT DOCUMENTS
WO 2003039211 5/2003

*Primary Examiner* — Tuyet Thi Vo
(74) *Attorney, Agent, or Firm* — Waddey & Patterson, P.C.; Mark J. Patterson; Gary L. Montle

(57) ABSTRACT

A lamp ballast is provided requiring less size and cost for powering a discharge lamp. An inverter circuit converts a DC voltage from a DC power source into a voltage having a determined frequency, and supplies the converted voltage to the discharge lamp inserted between a pair of output ends of the inverter. A resonant circuit includes an auto-transformer and a resonant capacitor, and supplies an output voltage corresponding to a frequency of the rectangular wave voltage of the power supply circuit to the discharge lamp. A voltage detection circuit detects an output voltage of the resonant circuit based on a potential of the resonant capacitor. A control circuit has a startup control mode to set the frequency of the rectangular wave voltage based on the detected voltage from the voltage detection circuit, wherein the output voltage of the resonant circuit exceeds a starting voltage of the discharge lamp.

22 Claims, 11 Drawing Sheets

| FIG. 1A |
| FIG. 1B |

DISCHARGE LAMP BALLAST HAVING AN AUTO-TRANSFORMER FOR HIGH VOLTAGE DETECTION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2008-300155, filed Nov. 25, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electronic ballasts for powering a discharge lamp. More particularly, the present invention relates to a discharge lamp ballast using an auto-transformer for high voltage detection in a resonant circuit.

Discharge lamp ballasts (or more specifically a high-pressure discharge lamp ballast) are conventionally known in the art for lighting high-pressure discharge lamps such as metal halide and high-pressure mercury lamps (high-intensity discharge lamps, which are also referred to as HID lamps).

An example of such a discharge lamp ballast is shown in FIG. 9 and includes a power supply circuit 100 for supplying a rectangular wave voltage with a polarity inverted at a predetermined frequency to a discharge lamp La (applying the voltage between both electrodes of the discharge lamp La), a resonant circuit 200 for supplying an output voltage corresponding to the frequency of the rectangular wave voltage of the power supply circuit 100 to the discharge lamp La (applying the voltage between both electrodes of the discharge lamp La), a voltage detection circuit 300 for detecting the output voltage of the resonant circuit 200 and a control circuit 400.

The power supply circuit 100 includes a power factor correction (PFC) circuit 110, a step-down converter circuit 111 and an inverter circuit 112.

The PFC circuit 110 outputs a DC voltage based on electric power obtained from an AC power source AC, and includes a filter 110a, a rectifier 110b and a step-up converter circuit 110c. The filter 110a further includes two capacitors C100, C101 and a choke coil (common mode choke coil) LF. The step-up converter circuit 110c raises an output voltage of the rectifier 110b and includes an inductor L100, a diode D100, a switch Q100, a resistor R100, capacitors C102, C103 and so on. The switch Q100 of the step-up converter circuit 110c is controlled by a step-up controller 113.

The step-down converter circuit 111 lowers an output voltage of the step-up converter circuit 110c and includes a switch Q101, a diode D101, an inductor L101 and so on. The switch Q101 of the step-down converter circuit 111 is controlled by a step-down controller 114. The power supply circuit 100 also includes a resistor R101 for detecting a lamp current of the discharge lamp La, a capacitor C104 for smoothing an output voltage of the step-down converter circuit 111, and resistors R102, R103 for detecting the output voltage of the step-down converter circuit 111.

The inverter circuit 112 supplies the rectangular wave voltage at a predetermined frequency to the discharge lamp La (applying the voltage between the both electrodes of the discharge lamp La). The inverter circuit 112 is a full-bridge circuit formed of four switches Q102 to Q105. In the inverter circuit 112, a connection point of the switch Q102 and the switch Q103 is a first output end and a connection point of the switch Q104 and the switch Q105 is a second output end. The discharge lamp La is coupled between the first and second output ends.

The resonant circuit 200 includes a resonant inductor L200 formed of a coil and a resonant capacitor C200. The resonant inductor L200 is inserted between one output end of the inverter circuit 112 and one electrode of the discharge lamp La. The resonant capacitor C200 is connected in parallel with the discharge lamp La. The resonant frequency of the resonant circuit 200 is determined depending on an inductance of the resonant inductor L200 and a capacitance of the resonant capacitor C200. The output voltage of the resonant circuit 200 is equal to the resonant voltage and is determined by the resonant frequency, and a frequency and amplitude of the rectangular wave voltage of the power supply circuit 10.

The voltage detection circuit 300 includes capacitors C300 to C304, resistors R301 to R304 and diodes D300, D301. The voltage detection circuit 300 detects a potential of a connection point between the resonant inductor L200 and the resonant capacitor C200.

The control circuit 400 controls turning ON/OFF of the switches Q102 to Q105 of the inverter circuit 112.

To light the discharge lamp La, it is necessary to supply a resonance voltage which is higher than a starting voltage to the discharge lamp La, thereby causing dielectric breakdown.

For this reason, the control circuit 400 has a starting mode for starting the discharge lamp La as an operation mode. In the starting mode, the control circuit 400 sets the frequency of the rectangular wave voltage of the power supply circuit 100 based on the detection result of the voltage detection circuit 300 so that the output voltage of the resonant circuit 200 exceeds the starting voltage of the discharge lamp La.

The starting voltage of the above-mentioned high-pressure discharge lamp is generally very high, and for example, in the starting mode, there are cases where the voltage as high as 3000 V must be supplied. For this reason, it is necessary to design the voltage detection circuit 300 so as to have a high voltage resistance, that is, to be able to withstand a high voltage. Specifically, the number of circuit components of the voltage detection circuit 300 is increased to lower the voltage exerted on individual components or high voltage resistance components are used as circuit components for the voltage detection circuit 300.

When the number of components is increased as in the former case, as a matter of course, the scale of the voltage detection circuit 300 becomes large. When high voltage resistance components are used as in the latter case, because these components are generally larger than low voltage resistance components, the scale of the voltage detection circuit 300 also becomes large.

For this reason, in the conventional discharge lamp ballast, the size of the voltage detection circuit 300 becomes large to account for the high startup voltage, resulting in that the discharge lamp ballast is disadvantageously grown in size.

When the resonant circuit 200 includes only the single resonant inductor L200 as shown in FIG. 9, the voltage which can be output from the resonant circuit 200 is determined depending on the output voltage of the step-down converter circuit 111. For this reason, to supply an appropriate voltage to the discharge lamp La, the output voltage of the step-down converter circuit 111 needs to be increased. However, when the output voltage of the step-down converter circuit 111 is increased, it is necessary to use high voltage resistance switching elements as the switches Q102 to Q105 of the inverter circuit 112, disadvantageously leading to a further increase in losses.

BRIEF SUMMARY OF THE INVENTION

In consideration of the above-mentioned matters, an object of the present invention is to provide a discharge lamp ballast which can reduce size and costs while securing starting ability of the discharge lamp.

According to a first aspect of the present invention, a discharge lamp ballast includes a power supply circuit for supplying a rectangular wave voltage with polarities inverted at a determined frequency to a discharge lamp; a resonant circuit for supplying an output voltage corresponding to a frequency of the rectangular wave voltage of the power supply circuit to the discharge lamp; a voltage detection circuit for detecting an output voltage of the resonant circuit; and a control circuit for setting the frequency of the rectangular wave voltage based on a detection result of the voltage detection circuit at startup of the discharge lamp so that the output voltage of the resonant circuit exceeds a starting voltage of the discharge lamp.

The power supply circuit includes an inverter circuit for converting a DC voltage obtained from a DC power source into the rectangular wave voltage and supplying the converted voltage to the discharge lamp connected between a pair of output ends. The resonant circuit includes a resonant inductor formed of an auto-transformer and a resonant capacitor, the resonant inductor being inserted between one output end of the inverter circuit and the discharge lamp, and the resonant capacitor being inserted between an intermediate tap of the resonant inductor and the other output end of the inverter circuit. The voltage detection circuit detects an output voltage based on a potential of the resonant capacitor.

According to the first aspect of the present invention, the auto-transformer is used as the resonant inductor forming the resonant circuit and the resonant capacitor is connected to the intermediate tap of the resonant inductor. For this reason, a voltage obtained by raising a voltage across a shunt winding (winding between one end of the resonant inductor connected to one output end of the inverter circuit and the intermediate tap) according to the turns ratio of the shunt winding to a series winding (winding between the other end of the resonant inductor connected to the discharge lamp and the intermediate tap) occurs across the resonant inductor. Accordingly, the voltage across the resonant capacitor becomes lower than the output voltage actually supplied to the discharge lamp. Thus, the potential detected by the voltage detection circuit can be decreased while maintaining the output voltage and it is not necessary to use high voltage resistance electrical components in forming the voltage detection circuit or increase the number of electrical components. As a result, the starting ability of the discharge lamp can be improved while also reducing size and cost. Furthermore, as described above, because the voltage raised at the resonant inductor (auto-transformer) can be supplied to the discharge lamp, the DC voltage input to the inverter circuit need not be increased. For this reason, it is not necessary to use high voltage resistance circuit components in the inverter circuit, thereby preventing increase in losses.

According to a second aspect of the present invention, a discharge lamp ballast is similar to that of the first aspect except that the power supply circuit includes an inverter circuit, a step-down inductor and a step-down capacitor. The inverter circuit converts a DC voltage from a DC power source into the rectangular wave voltage and supplies the converted voltage to the discharge lamp inserted between a pair of output ends. The step-down inductor is inserted between one output end of the inverter circuit and the discharge lamp, and the step-down capacitor is inserted between a connection point of the step-down inductor and the discharge lamp and the other output end of the inverter circuit.

According to the second aspect of the present invention, because it is not necessary to provide the step-down chopper circuit or the like separately from the inverter circuit, scale can be reduced and further reduction of size and cost achieved.

According to a third aspect of the present invention, a discharge lamp ballast is similar to that of the first aspect except that the power supply circuit includes an inverter circuit, a step-down inductor, a first step-down capacitor and a second step-down capacitor. The inverter circuit converts a DC voltage obtained from a DC power source into the rectangular wave voltage and supplies the converted voltage to the discharge lamp inserted between a pair of output ends. The step-down inductor is inserted between one output end of the inverter circuit and the discharge lamp. The first step-down capacitor is inserted between a connection point of the step-down inductor and the discharge lamp and a positive electrode of the DC power source. The second step-down capacitor is inserted between the connection point and a negative electrode of the DC power source.

According to the third aspect of the present invention, because it is not necessary to provide the step-down chopper circuit or the like separately from the inverter circuit, circuit scale can be reduced and further reduction of size and cost can be achieved. In addition, as described above, because the voltage raised at the resonant inductor (auto-transformer) can be supplied to the discharge lamp, the DC voltage input to the inverter circuit need not be increased. For this reason, it is not necessary to use high voltage resistance circuit components in the inverter circuit, thereby preventing increase in losses.

According to a fourth aspect of the present invention, at startup of the discharge lamp, the control circuit changes the frequency of the rectangular wave voltage in a predetermined frequency range so that the frequency of the rectangular wave voltage gets close to a target frequency, and the target frequency is 1/(an odd number) of the resonant frequency of the resonant circuit.

According to the fourth aspect of the present invention, the curve which is substantially similar to the resonance curve in the vicinity of the resonant frequency of the resonant circuit can be used, thereby securing the voltage supplied to the discharge lamp. Furthermore, because the inductance value of the resonant inductor of the resonant circuit can be made smaller, reduction is size and costs can be achieved.

According to a fifth aspect of the present invention, the resonant capacitor includes a series circuit formed of a plurality of capacitors and the voltage detection circuit detects the output voltage based on the potential of one of the plurality of capacitors.

According to the fifth aspect of the present invention, as compared to the case where the resonant capacitor is formed of a single capacitor, the potential detected by the voltage detection circuit can be further lowered. For this reason, a voltage detection circuit having a lower voltage resistance can be adopted. Thus, further reduction of size and cost can be achieved.

According to a sixth aspect of the present invention, a fixture main body is provided to which a discharge lamp powered by the discharge lamp ballast is attached.

According to the sixth aspect of the present invention, size and cost can be reduced while securing the starting ability of the discharge lamp.

According to a seventh aspect of the present invention, a projector main body is provided to which a discharge lamp powered by the discharge lamp ballast is attached.

According to the seventh aspect of the present invention, size and costs can be reduced while securing the starting ability of the discharge lamp.

DETAILED DESCRIPTION OF THE INVENTION

Figures 1, 1A:
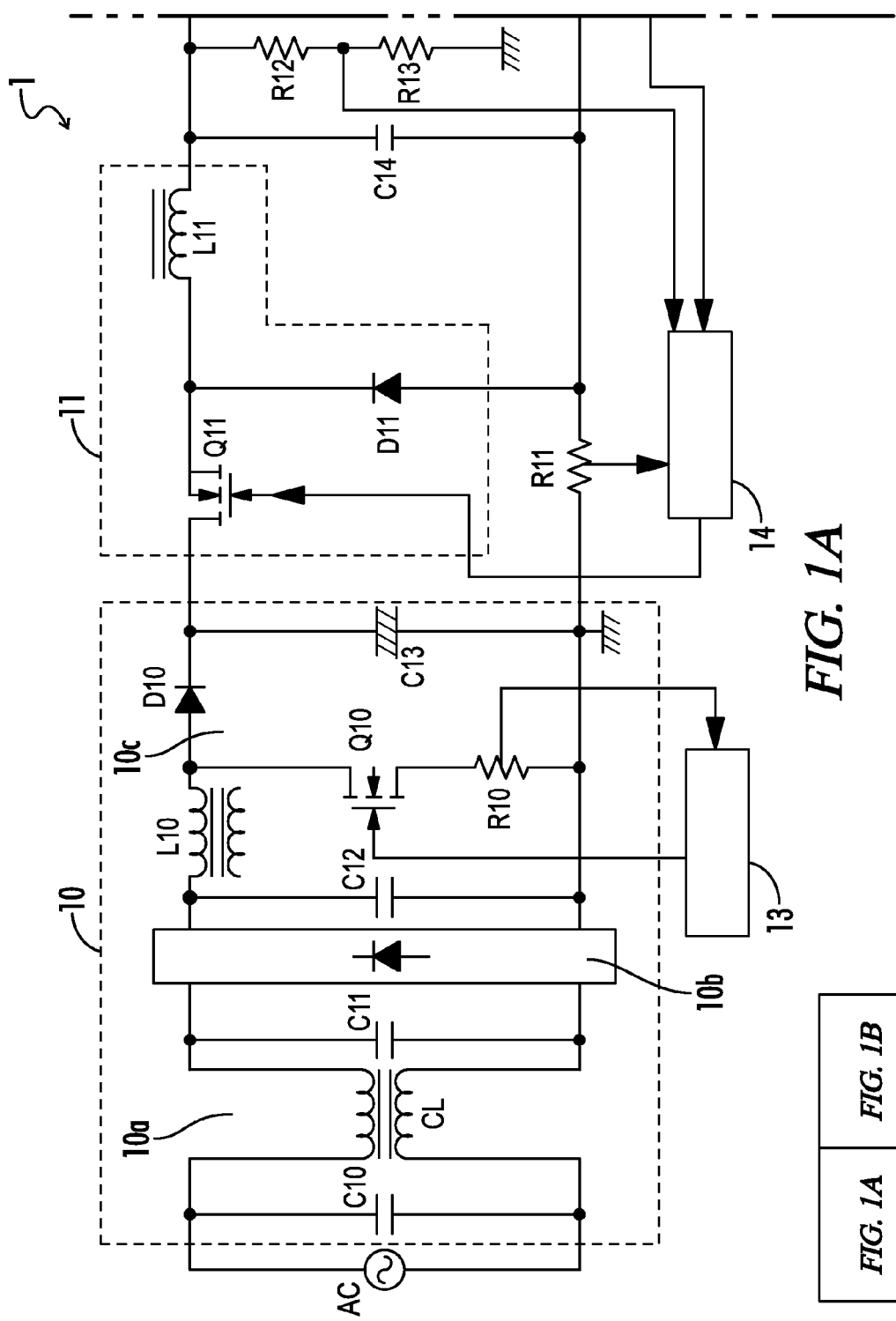
FIG. 1 is a circuit diagram of a first embodiment of a discharge lamp ballast of the present invention.
Figure 1B:
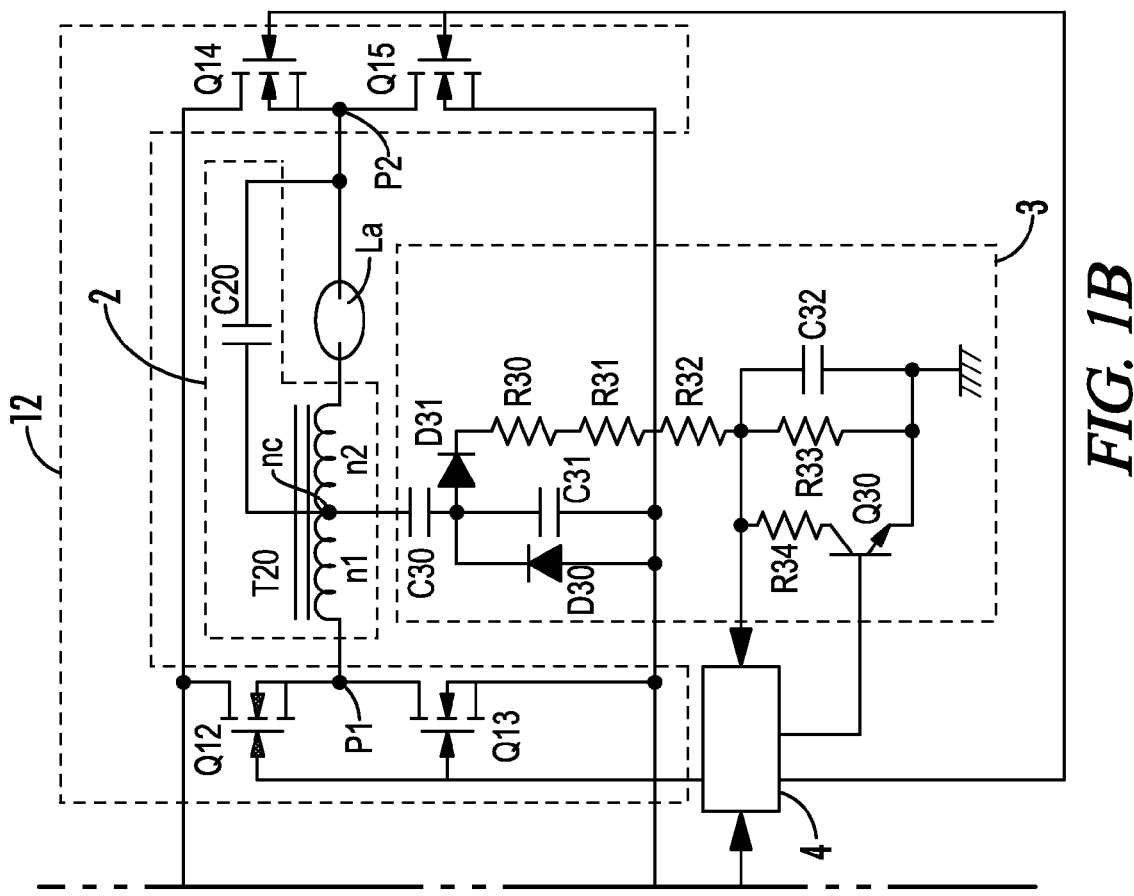
Figure 2:
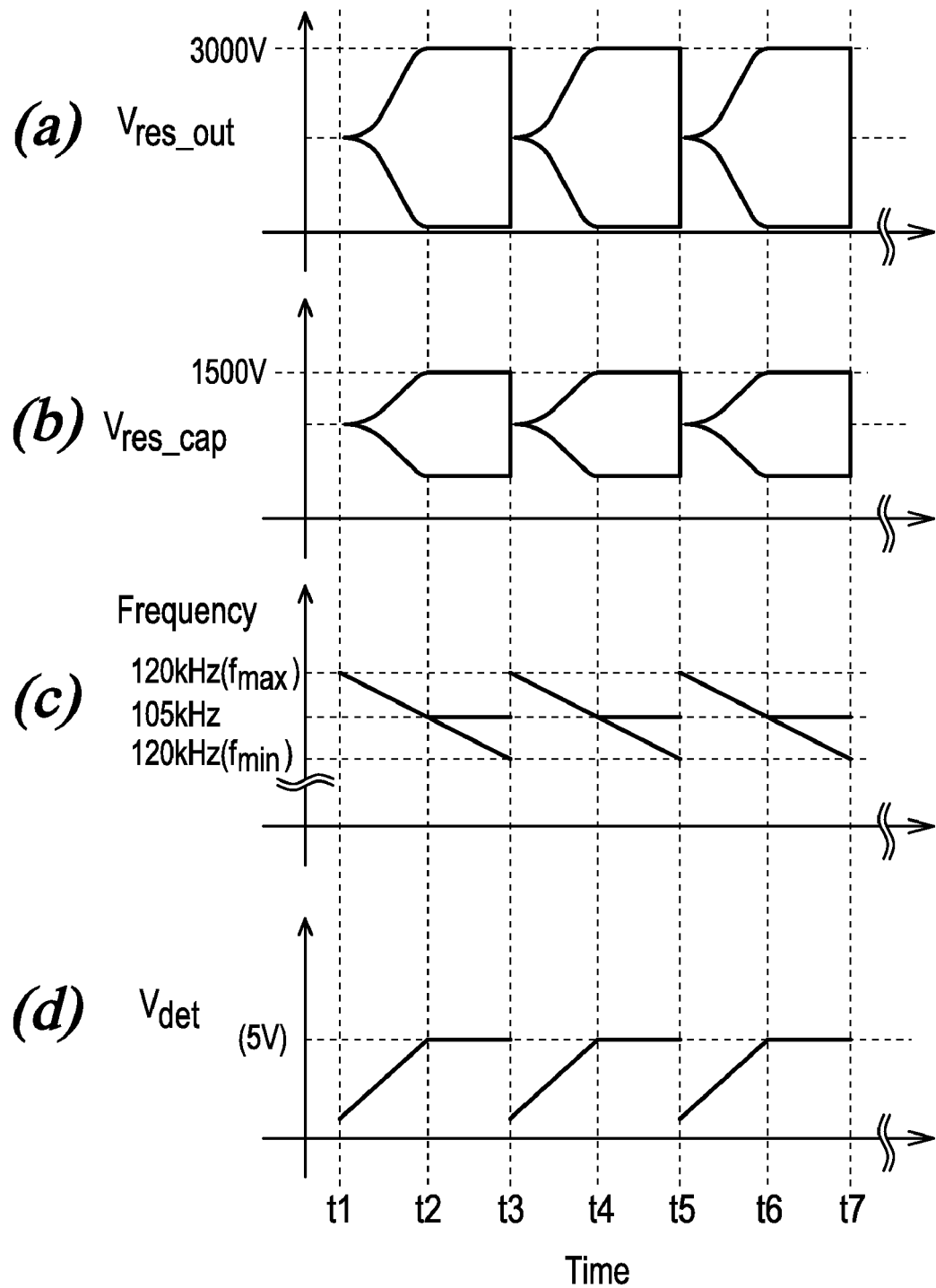
FIG. 2 are waveform charts showing operations of the discharge lamp ballast of FIG. 1 at startup.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

A discharge lamp ballast in accordance with the present invention may be described herein with reference to FIGS. 1-8. The present invention in various embodiments has the effect of reducing size and costs while securing the starting ability of the discharge lamp.

Where the various figures may describe embodiments sharing various common elements and features with other embodiments, similar elements and features are given the same reference numerals and redundant description thereof may be omitted below.

Referring to FIG. 1, a discharge lamp ballast of the present invention may be a high-pressure discharge lamp ballast for lighting high-pressure discharge lamps such as for example a metal halide lamp and a high-pressure mercury lamp (high-intensity discharge lamps, which are also referred to as HID lamps).

The discharge lamp ballast in the present embodiment serves to light a discharge lamp La as the high-pressure discharge lamp by electric power obtained from an AC power source AC and, as shown in FIG. 1, includes a power supply circuit 1, a resonant circuit 2, a voltage detection circuit 3 and a control circuit 4. A commercial AC power source having a frequency of 60 Hz and an effective value (nominal value) of 100V may be assumed as the AC power source AC in this example.

The power supply circuit 1 may primarily include a PFC circuit (power factor correction circuit) 10, a step-down converter circuit 11 and an inverter circuit 12.

The PFC circuit 10 is provided to output a DC voltage based on the electric power supplied from the AC power source AC. The PFC circuit 10 includes a filter 10a, a rectifier 10b and a step-up converter circuit 10c. The filter 10a includes two capacitors (condensers) C10, C11 and a choke coil (common mode choke coil) CL. The rectifier 10b is formed of a diode bridge for full-wave rectification of the AC voltage provided from the AC power source AC.

The step-up converter circuit 10c includes a step-up chopper circuit as a main component and is used to raise an output voltage from the rectifier 10b. In an embodiment as shown, the step-up converter circuit 10c includes an inductor L10, a diode D10, a switch Q10, a resistor R10 and capacitors C12, C13. Here, the capacitor C12 is a smoothing capacitor inserted between output terminals of the rectifier 10b. One end of the inductor L10 is connected to the high potential-side output terminal of the rectifier 10b and the other end of the inductor L10 is connected to an anode of the diode D10. The switch Q10 is a switching element such as for example a MOSFET and is inserted between the other end of the inductor L10 and the low potential-side output terminal of the rectifier 10b. The resistor R10 is a resistor for current detection and is inserted between the switch Q10 and a low potential-side output terminal of the rectifier 10b. The capacitor C13 is a capacitor for smoothing the output voltage of the step-up converter circuit 10c and is inserted between a cathode of the diode D10 and a reference potential point (ground).

The step-down converter circuit 11 is formed of a step-down chopper circuit and is used to lower the output voltage of the step-up converter circuit 10c. In the embodiment shown, the step-down converter circuit 11 includes a switch Q11, a diode D11 and an inductor L11. The switch Q11 is a semiconductor switching element such as a MOSFET and is inserted between a high potential-side terminal of the capacitor C13 and the inductor L11. A cathode of the diode D11 is connected between the switch Q11 and the inductor L11 and an anode of the D11 is connected to the ground through a resistor R11. Here, the resistor R11 is a resistor for lamp current detection. A capacitor C14 is connected in parallel to a series circuit formed of the inductor L11 and the diode D11. The capacitor C14 is a capacitor for smoothing the output voltage of the step-down converter circuit 11. A series circuit formed of resistors R12, R13 is connected to the capacitor C14. The series circuit is a voltage dividing circuit for detecting the output voltage of the step-down converter circuit 11.

The power supply circuit 1 includes a step-up controller 13 for controlling the switch Q10 of the step-up converter circuit 10b. The step-up controller 13 may include, for example, a logic circuit and a microcomputer as its main components. The step-up controller 13 performs an ON/OFF control of the switch Q10 with reference to a current value detected in the resistor R10 so that a voltage between both terminals of the capacitor C13, (that is, the output voltage of the step-up converter circuit 10b) may be a predetermined voltage. Control of the switch Q10 is performed, for example, by feeding a PWM (pulse width modulated) signal from the step-up controller 13 to the switch Q10.

The power supply circuit 1 also includes a step-down controller 14 for controlling the switch Q11 of the step-down converter circuit 10b. The step-down controller 14 may also include, for example, a logic circuit and a microcomputer as its main components. The step-down controller 14 performs an ON/OFF control of the switch Q11 with reference to a current value detected in the resistors R12, R13 so that a voltage between both terminals of the capacitor C14 (that is, the output voltage of the step-down converter circuit 11) may be a predetermined voltage. The control of the switch Q11 is performed, for example, by feeding a PWM signal from the step-down controller 14 to the switch Q11.

The inverter circuit 12 is a circuit for supplying a rectangular wave voltage with the polarities inverted at a predetermined frequency to the discharge lamp La (for applying the rectangular wave voltage between both electrodes of the discharge lamp La). The inverter circuit 12 includes four switches Q12 to Q15. Described in greater detail, the inverter circuit 12 in one embodiment is a full-bridge circuit having a series circuit formed of switches Q12, Q13 each connected in parallel to the capacitor C14 and a series circuit formed of switches Q14, Q15. In the inverter circuit 12, a connection point between the switch Q12 and the switch Q13 is a first output end P1, a connection point between the switch Q14 and the switch Q15 is a second output end P2, and the discharge lamp La is connected between the output ends P1, P2. The switches Q12 to Q15 each are a semiconductor switching element such as an MOSFET.

The PFC circuit 10, the step-down converter circuit 11, the step-up controller 13 and the step-down controller 14 in the above-mentioned power supply circuit 1 together with the AC power source AC form a DC power source. Thus, the inverter circuit 12 converts a DC voltage obtained from the DC power source (that is, the output voltage of the step-down converter circuit 11) into the above-mentioned rectangular wave voltage and applies the converted voltage to between the both electrodes of the discharge lamp La inserted between the pair of output ends P1, P2.

The resonant circuit 2 supplies the output voltage corresponding to a frequency of the rectangular wave voltage of the power supply circuit 1 to the discharge lamp La and includes a resonant inductor T20 and a resonant capacitor C20. The resonant inductor T20 is inserted between the first output end P1 of the inverter circuit 12 and one electrode of the discharge lamp La. In the resonant circuit 2 in the present embodiment, the resonant inductor T20 may be an auto-transformer, in which a primary winding n1 is serially connected to a secondary winding n2. An intermediate tap nc is drawn from between the primary winding n1 and the secondary winding n2. In the embodiment as shown, the primary winding n1 is a winding disposed between an end of the resonant inductor T20 connected to the first output end P1 of the inverter circuit 12 and an intermediate tap nc, and is used as a shunt winding. The secondary winding n2 is a winding disposed between an end of the resonant inductor T20 connected to the discharge lamp La and the intermediate tap nc, and is used as a series winding. The resonant capacitor C20 is inserted between the intermediate tap nc of the resonant inductor T20 and the second output end P2 of the inverter circuit 12.

In the resonant circuit 2 in the present embodiment, the primary winding n1 of the resonant inductor T20 and the resonant capacitor C20 constitute an LC series resonant circuit. A resonant frequency of the LC series resonant circuit is determined depending on inductance of the primary winding n1 of the resonant inductor T20 and capacitance of the resonant capacitor C20. A resonance voltage of the LC series resonant circuit is determined depending on the resonant frequency of the LC series resonant circuit, and a frequency and amplitude of the rectangular wave voltage of the power supply circuit 1.

The output voltage of the resonant circuit 2 is equal to a voltage across resonant inductor T20. The voltage across resonant inductor T20 is equal to a voltage obtained by raising the resonant voltage of the LC series resonant circuit according to the turns ratio of the primary winding n1 to the secondary winding n2 (that is, a turns ratio of the shunt winding to the series winding). For example, when the turns ratio is 1:1, the output voltage which is equal to a voltage obtained by doubling the voltage across resonant capacitor C20 is supplied to the discharge lamp La.

The voltage detection circuit 3 serves to detect the output voltage of the resonant circuit 2. The voltage detection circuit 3 includes capacitors C30 to C32, resistors R30 to R34, diodes D30, D31 and a switch Q30. In the voltage detection circuit 3, one end of the capacitor C30 is connected to the intermediate tap nc of the resonant inductor T20. The other end of the capacitor C30 is connected to a low potential-side terminal of the capacitor C14 through the capacitor C31. A cathode of the diode D30 and an anode of the diode D31 are connected to the other end of the capacitor C30. An anode of the diode D30 is connected to the low potential-side terminal of the capacitor C14. The resistors R30 to R33 are sequentially connected in series and constitute a voltage dividing circuit. The voltage dividing circuit is inserted between the cathode of the diode D30 and the ground. The capacitor C32 is connected in parallel to the resistor R33 of the voltage dividing circuit, and connected in parallel to a series circuit formed of the resistor R34 and the switch Q30.

The voltage detection circuit 3 outputs a voltage obtained by dividing a voltage, which is equal to an absolute value of a potential of the resonant capacitor C20, by the voltage dividing circuit (in the present embodiment, a voltage between both ends of the resistor R33) as a detection voltage to the control circuit 4. Here, the switch Q30 serves to change a voltage dividing ratio of the voltage dividing circuit, and is formed of a semiconductor switching element such as for example a bipolar transistor. The switch Q30 is controlled to be turned ON/OFF by the control circuit 4.

Even when the potential of the resonant capacitor C20 is high, the voltage detection circuit 3 can set the detection voltage to a level which can be detected by the control circuit 4 by appropriately setting the voltage dividing ratio. For example, even when the potential of the resonant capacitor C20 is 1500V, the voltage dividing ratio can be set so that the detection voltage becomes 5V.

The control circuit 4 controls turning ON/OFF of the switches Q12 to Q15 of the inverter circuit 12. The control circuit 4 may include, for example, a microcomputer as its main component. The control of each of the switching elements Q12 to Q15 is performed by supplying a PWM signal from the control circuit 4 to each of the switching elements Q12 to Q15.

The high-pressure discharge lamp has a characteristic that, after occurrence of dielectric breakdown, arc discharge starts through glow discharge, and then, at the time when temperature in a luminous tube is made uniform and stabilized, a lamp voltage becomes substantially constant. Therefore, to light the high-pressure discharge lamp, it is necessary to cause dielectric breakdown.

For this reason, the control circuit 4 has two operation modes: a starting mode and a steady-state mode.

In the steady-state mode, the control circuit 4 controls the switches Q12 to Q15 so that a state where the switches Q12, Q15 are turned ON and the switches Q13, Q14 are turned OFF (first state) and a state where the switches Q12, Q15 are turned OFF and the switches Q13, Q14 are turned ON (second state) are alternately replaced with each other. Thereby, the rectangular wave voltage is applied between the output ends P1, P2 of the inverter circuit 12. Here, the frequency of the rectangular wave voltage is determined depending on the time when the first state and the second state are replaced with each other. In the steady-state mode, the frequency of the rectangular wave voltage is set to, for example, about 100 Hz.

In the starting mode, the control circuit 4 sets the frequency of the rectangular wave voltage of the power supply circuit 1 based on the detection result of the voltage detection circuit 3 so that the output voltage of the resonant circuit 2 exceeds the starting voltage of the discharge lamp La. Here, the control circuit 4 adjusts (sweeps) the frequency of the rectangular wave voltage within a predetermined frequency range so that the frequency of the rectangular wave voltage approaches a target frequency. In the present embodiment, the control circuit 4 gradually adjusts the frequency of the rectangular wave voltage from a high frequency side toward a low frequency side, and fixes the frequency of the rectangular wave voltage at the time when the output voltage of the resonant circuit 2 reaches a predetermined voltage exceeding the starting voltage of the discharge lamp La. In this case, the target frequency is a resonant frequency of the resonant circuit 2 (the resonant frequency of the LC series resonant circuit).

Operation of the control circuit 4 in the starting mode will be described below referring to FIGS. 2(a) to 2(d). A number of assumptions are made herein for descriptive purposes only and are not intended to be limiting on the scope of the present invention. The resonant frequency of the LC series resonant circuit in the resonant circuit 2 is assumed to be 100 kHz, the predetermined voltage is 3000 V, the turns ratio of the primary winding n1 to the secondary winding n2 in the resonant inductor T20 is 1:1 and a magnitude of the detection voltage of the voltage detection circuit 3 is 1/300 of the voltage between the both ends of the resonant capacitor C20. FIG. 2(a) shows a change of the output voltage V_res_out of the resonant circuit 2 with respect to time, FIG. 2(b) shows a change of the voltage V_res_cap across the resonant capacitor C20 with respect to time, FIG. 2(c) shows a change of the frequency of the rectangular wave voltage with respect to time and FIG. 2(d) shows a change of the detection voltage Vdet of the voltage detection circuit 3 with respect to time.

In this example, a range in which the frequency of the rectangular wave voltage is swept may be determined based on the resonant frequency of the LC series resonant circuit. In the present embodiment, a maximum frequency f_max of the rectangular wave voltage is set to 120 kHz and a minimum frequency f_min of the rectangular wave voltage is set to 95 kHz. The turns ratio of the primary winding n1 to the secondary winding n2 of the resonant inductor T20 in the resonant circuit 2 is 1:1. For this reason, when the voltage across the resonant capacitor C20 reaches 1500 V, the output voltage of the resonant circuit 2 becomes 3000V. When the voltage across the resonant capacitor C20 is 1500 V, the detection voltage of the voltage detection circuit 3 is 5 V. Thus, in the control circuit 4, a threshold value at which the frequency of the rectangular wave voltage is fixed is set to 5 V.

In the starting mode, the control circuit 4 first sets the frequency of the rectangular wave voltage to 120 kHz (at time t1). Thereafter, the control circuit 4 lowers the frequency of the rectangular wave voltage, sweeping from the maximum frequency f_max through the predetermined range described above. Consequently, the resonant voltage V_res_cap of the LC series resonant circuit and the output voltage V_res_out of the resonant circuit 2 both rise, and the detection voltage V_det of the voltage detection circuit 3 also rises.

When the detection voltage V_det of the voltage detection circuit 3 reaches 5V (at time t2), the control circuit 4 fixes the frequency of the rectangular wave voltage. The frequency is fixed to 105 kHz in the example shown in FIG. 2(c), noting the solid line in contrast to the dashed line demonstrating the projected path of the frequency sweep from the fixed frequency to the minimum frequency if the frequency were not fixed at that point. Thereby, the output voltage V_res_out of the resonant circuit 2 is maintained at 3000 V. Thereafter, similar operations are repeated at times t3, t4, t5, t5, t6, . . . . After the discharge lamp La is started (properly ignited), the control circuit 4 shifts from the starting mode to the steady-state mode. Whether or not the discharge lamp La is started can be determined, for example, by using the lamp current detected by the resistor R11. Various methods for determining proper startup of the discharge lamp are well known in the art, and thus description thereof may be omitted.

As described above, in an embodiment the auto-transformer is used as the resonant inductor T20 of the resonant circuit 2, and the resonant capacitor C20 is connected to the intermediate tap nc of the resonant inductor T20. For this reason, a voltage obtained by raising the voltage across the primary winding n1 as the shunt winding (winding between one end of the resonant inductor T20 connected to the first output end P1 in the inverter circuit 12 and the intermediate tap nc) according to the turns ratio of the primary winding n1 to the secondary winding n2 as the series winding (winding between the other end of the resonant inductor T20 connected to the discharge lamp La and the intermediate tap nc) occurs between the both ends of the resonant inductor T20. In other words, by adjusting the turns ratio of the primary winding n1 to the secondary winding n2 in the resonant inductor T20, the output voltage V_res_out of the resonant circuit 2 can be set.

Therefore, in the discharge lamp ballast of an embodiment as shown, the voltage across the resonant capacitor C20 may become lower than the output voltage of the resonant circuit 2 actually supplied to the discharge lamp La. Thus, the potential detected by the voltage detection circuit 3 can be decreased while maintaining the output voltage of the resonant circuit 2. For this reason, it is not necessary to use high voltage resistance electrical components in forming the voltage detection circuit 3, or to unnecessarily increase the number of electrical components. Thereby, the starting ability of the discharge lamp La can be improved, and a reduction of size and cost can be achieved. Advantageously, the auto-transformer, in particular, can be reduced in size more easily than an insulating transformer.

Furthermore, as described above, because the voltage raised by the resonant inductor T20 formed of the auto-transformer can be supplied to the discharge lamp La, the DC voltage (output voltage of the step-down converter circuit 11) input to the inverter circuit 12 need not be increased. For this reason, it is not necessary to use high voltage resistance circuit components in the inverter circuit 12, for example, high voltage resistance switching elements as the switches Q12 to Q15, thereby further preventing increased losses.

Although the turns ratio of the primary winding n1 to the secondary winding n2 in the resonant inductor C20 is 1:1 in the above-mentioned example, it is not limited to 1:1.

As described above, the control circuit 4 may change (sweep) the frequency of the rectangular wave voltage in the predetermined frequency range so that the frequency of the rectangular wave voltage approaches the target frequency. In an embodiment the target frequency is set to the resonant frequency of the resonant circuit 2. However, the target frequency may rather be 1/(an odd number) of the resonant frequency of the resonant circuit 2. For example, when the resonant frequency of the resonant circuit 2 is 300 kHz, 100 kHz, which is ⅓ of 300 kHz, may be set as the target frequency. In this case, for example, as in the above-mentioned example, a maximum frequency of the rectangular wave voltage may be set to 120 kHz and a minimum frequency of the rectangular wave voltage may be set to 95 kHz.

In this manner, a curve which is substantially similar to a resonant curve in the vicinity of the resonant frequency of the resonant circuit 2 can be used. For this reason, the voltage supplied to the discharge lamp La (the output voltage of the resonant circuit 2) can be adequately secured while lowering the frequency of the rectangular wave voltage. Furthermore, because an inductance value of the resonant inductor T20 in the resonant circuit 2 can be made smaller, reduction of size and cost can be achieved. The target frequency is not limited to ⅓ of the resonant frequency of the resonant circuit 2 and only needs to be 1/(an odd number) such as ⅕ and ⅐ of the resonant frequency of the resonant circuit 2. Alternatively, the target frequency may be made approximately, rather than exactly, 1/(an odd number) of the resonant frequency of the resonant circuit 2.

Figure 3:
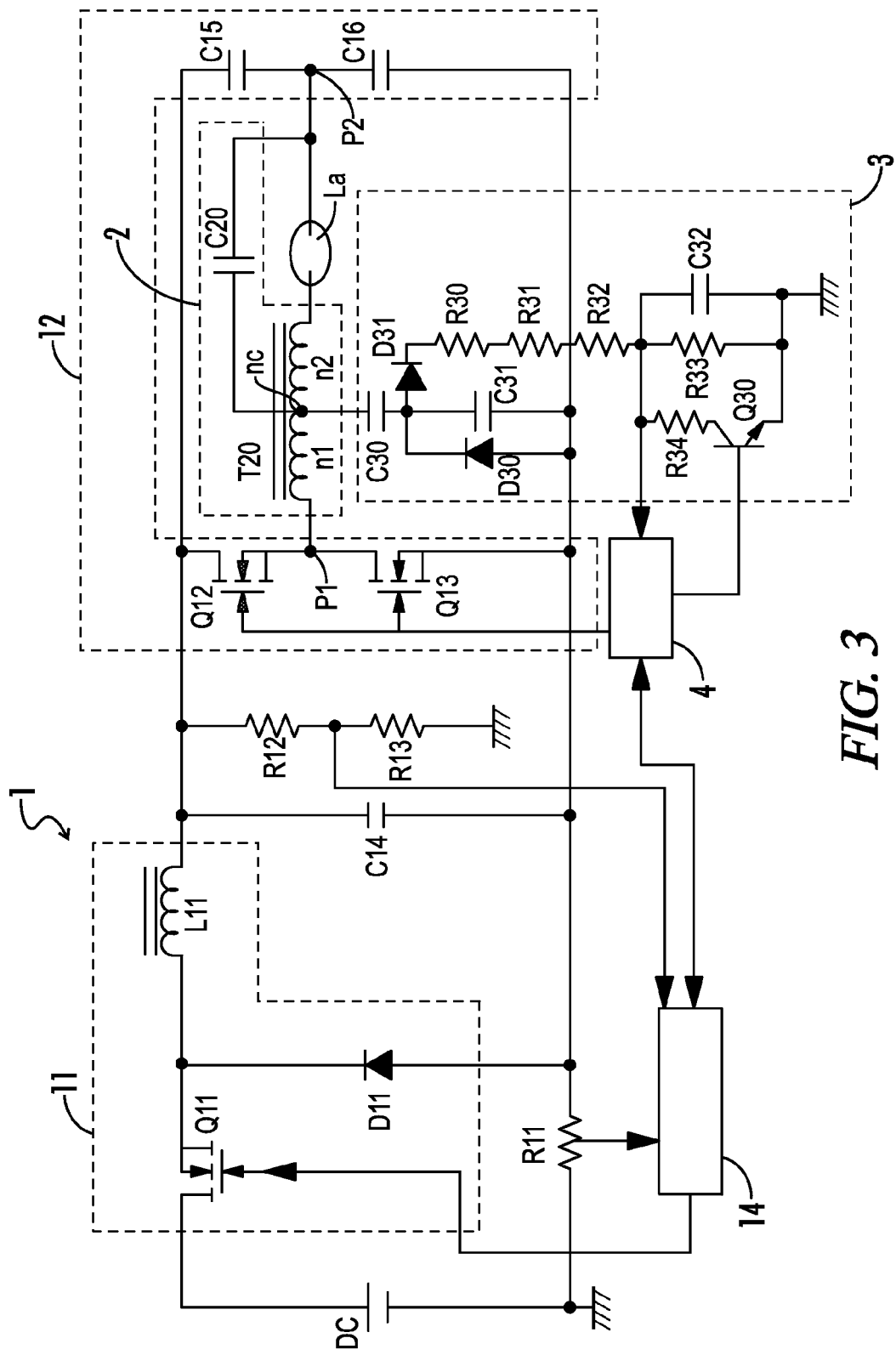
FIG. 3 is a circuit diagram showing another example of the discharge lamp ballast of the first embodiment.

Although the inverter circuit 12 is a full-bridge circuit (full-bridge inverter circuit) in the example shown in FIG. 1, a half-bridge circuit (half-bridge inverter circuit) as shown in FIG. 3 may be adopted. In FIG. 3, for simplification of illustration, the AC power source AC and the PFC circuit 10 are shown as the DC power source DC. Because only an inverter circuit 12 in the discharge lamp ballast shown in FIG. 3 is different from the inverter circuit 12 in FIG. 1, similar elements are given the same reference numerals and further description thereof is omitted.

The inverter circuit 12 shown in FIG. 3 includes switches Q12, Q13 and capacitors C15, C16. In the inverter circuit 12, a series circuit formed of the switches Q12, Q13 and a series circuit formed of the capacitor C15, C16 each are connected to the capacitor C14 in parallel. The discharge lamp ballast shown in FIG. 3 can obtain similar effects to those obtained by the discharge lamp ballast shown in FIG. 1.

Figure 4:
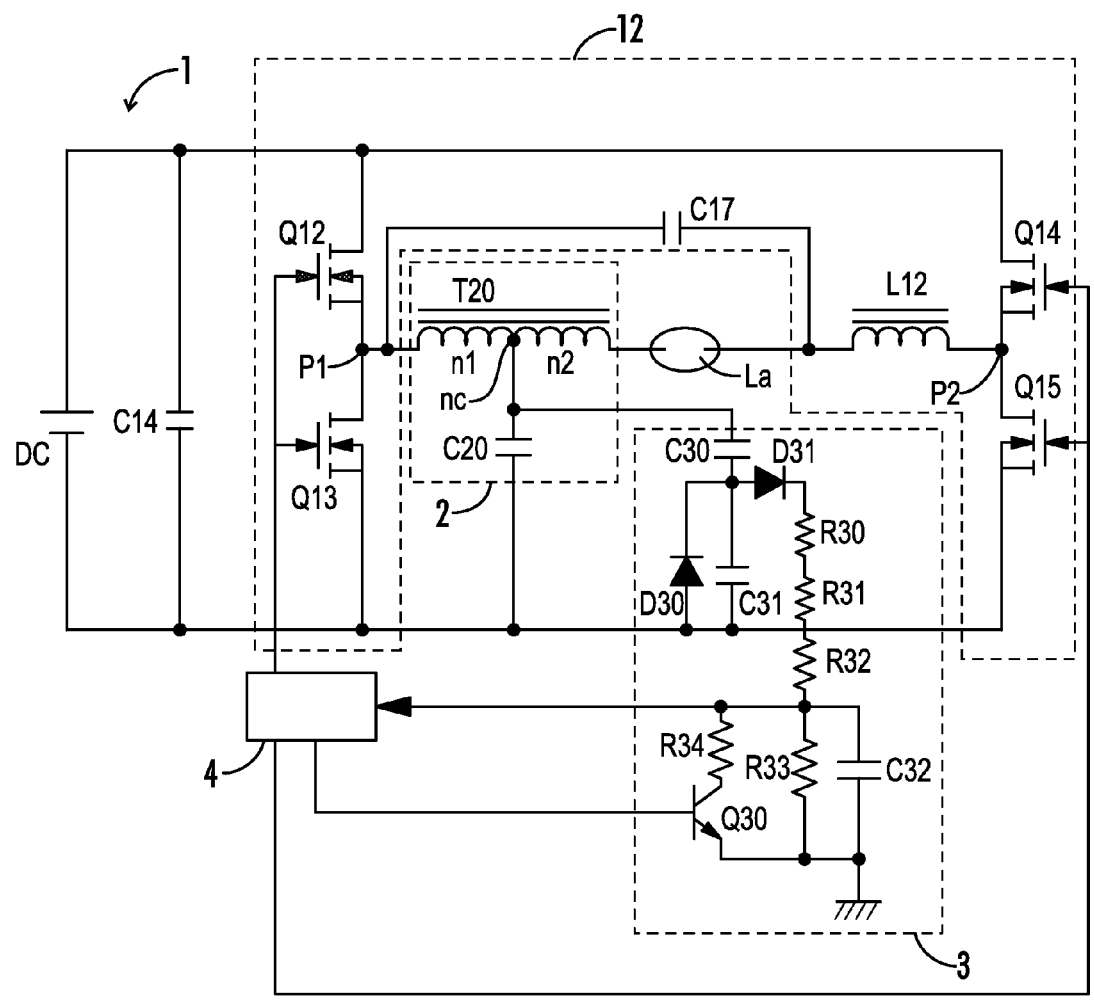
FIG. 4 is a circuit diagram showing another embodiment of the discharge lamp ballast of the present invention.

Referring now to FIG. 4, in an embodiment of a discharge lamp ballast as shown, the power supply circuit 1 and the control circuit 4 are the primary distinctions of substance from the previous embodiments. The power supply circuit 1 in the present embodiment includes a step-down inductor L12 and a step-down capacitor C17 in place of the step-down converter circuit 11 (referring to FIG. 1). The power supply circuit 1 in the present embodiment does include the PFC circuit 10 and the inverter circuit 12. However, in FIG. 4, for simplification of illustration, the AC power source AC and the PFC circuit 10 are shown as the DC power source DC.

The inverter circuit 12 includes the four switches Q12 to Q15. As shown in FIG. 4, a step-down inductor L12 is inserted between the output end P2 of the inverter circuit 12 and the electrode (electrode electrically connected to the output end P2) of the discharge lamp La. The step-down capacitor C17 is inserted between the connection point of the step-down inductor L12 and the discharge lamp La, and the output end P1 of the inverter circuit 12.

In other words, in the power supply circuit 1 in the present embodiment, the switches Q12 to Q15, the step-down inductor L12 and the step-down capacitor C17 constitute a step-down chopper circuit.

The resonant circuit 2 in the present embodiment includes the resonant inductor T20 formed as the auto-transformer and the resonant capacitor C20. The resonant inductor T20 is inserted between the output end P1 of the inverter circuit 12 and the electrode (electrode electrically connected to the output end P1) of the discharge lamp La. The resonant capacitor C20 is inserted between the intermediate tap nc of the resonant inductor T20 and a negative electrode of the DC power source DC. One end of the capacitor C30 of the voltage detection circuit 3 is connected to the intermediate tap nc of the resonant inductor T20.

The control circuit 4 in the present embodiment has the starting mode and the steady-state mode as operation modes. However, in the control circuit 4 in the present embodiment, control of the switches Q12 to Q15 in the steady-state mode is different from that in previously described embodiments.

Figure 5:
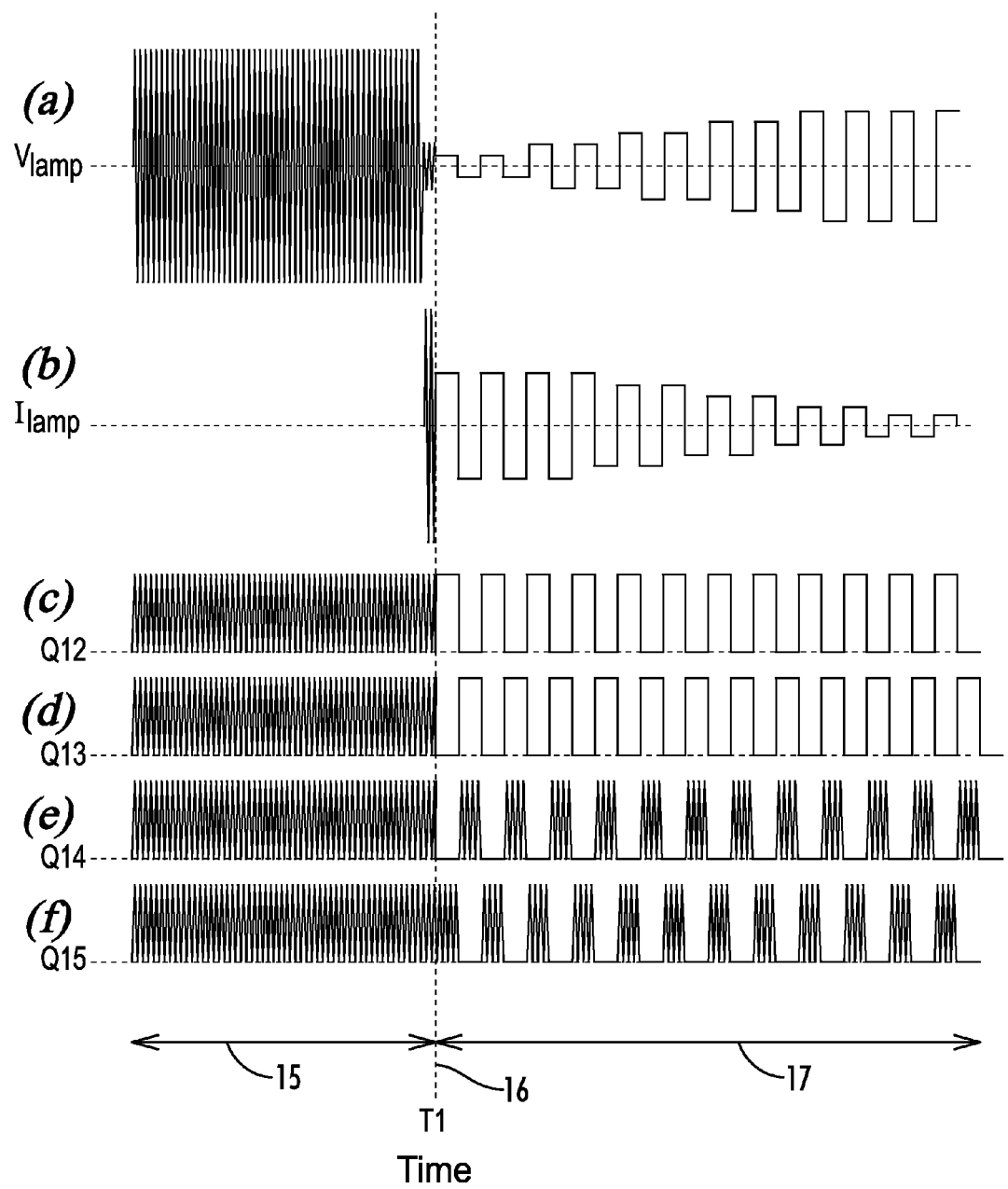
FIG. 5 are waveform charts showing operations of the discharge lamp ballast of FIG. 4.

Referring to FIG. 5, an operation of the control circuit 4 in accordance with the embodiment of FIG. 4 may be described. FIG. 5(a) shows the voltage Vlamp (lamp voltage) applied across the electrodes of the discharge lamp La with respect to time, and FIG. 5(b) shows the lamp current across the discharge lamp La with respect to time. FIGS. 5(c)-(f) show ON/OFF adjustments of the switches Q12 to Q15 with respect to time, respectively. Each of FIGS. 5(a)-(f) demonstrate operation of the control circuit 4 through the starting mode 15, ignition 16 of the lamp, and into the steady-state mode 17 of operation.

In the steady-state mode 17, the control circuit 4 in the present embodiment alternately performs a control mode to turn ON/OFF the switch Q15 with a predetermined frequency in the state where the switch Q12 is turned ON and the switches Q13, Q14 are turned OFF (first control mode), and a control mode to turn ON/OFF the switch Q13 with the predetermined frequency in the state where the switch Q14 is turned ON and the switches Q12, Q15 are turned OFF (second control mode). Thereby, the rectangular wave voltage is applied between both electrodes of the discharge lamp La. The predetermined frequency is set to be higher than the frequency of the rectangular wave voltage. For example, when the frequency of the rectangular wave voltage is a few hundreds of Hz, the predetermined frequency is set to from a few hundreds of Hz to a few dozens of kHz.

The power supply circuit 1 in the present embodiment is, as described above, provided with the step-down inductor L12 and the step-down capacitor C17. For this reason, according to the first control mode, the switch Q15, the step-down inductor L12 and the step-down capacitor C17 constitute the step-down chopper circuit. A voltage value of the rectangular wave voltage at this time increases/decreases depending on the ON/OFF frequency of the switch Q15. On the other hand, according to the second control mode, the switch Q13, the step-down inductor L12 and the step-down capacitor C17 constitute the step-down chopper circuit. A voltage value of the rectangular wave voltage at this time increases/decreases depending on the ON/OFF frequency of the switch Q13.

In other words, in the power supply circuit 1 in the present embodiment, a part of the inverter circuit 12 (switches Q13, Q15) is also used as the step-down chopper circuit.

Therefore, because in the discharge lamp ballast of the present embodiment there is no need to provide the step-down chopper circuit (step-down converter circuit 11) or the like separately from the inverter circuit 12, circuit scale can be reduced and further reduction of size and costs can be achieved. As shown in FIG. 4, the resonant capacitor C20 may be inserted between the intermediate tap nc of the resonant inductor T20 and the negative electrode of the DC power source DC. However, the resonant capacitor C20 may be inserted between the intermediate tap nc of the resonant inductor T20 and the positive electrode of the DC power source DC.

Figure 6:
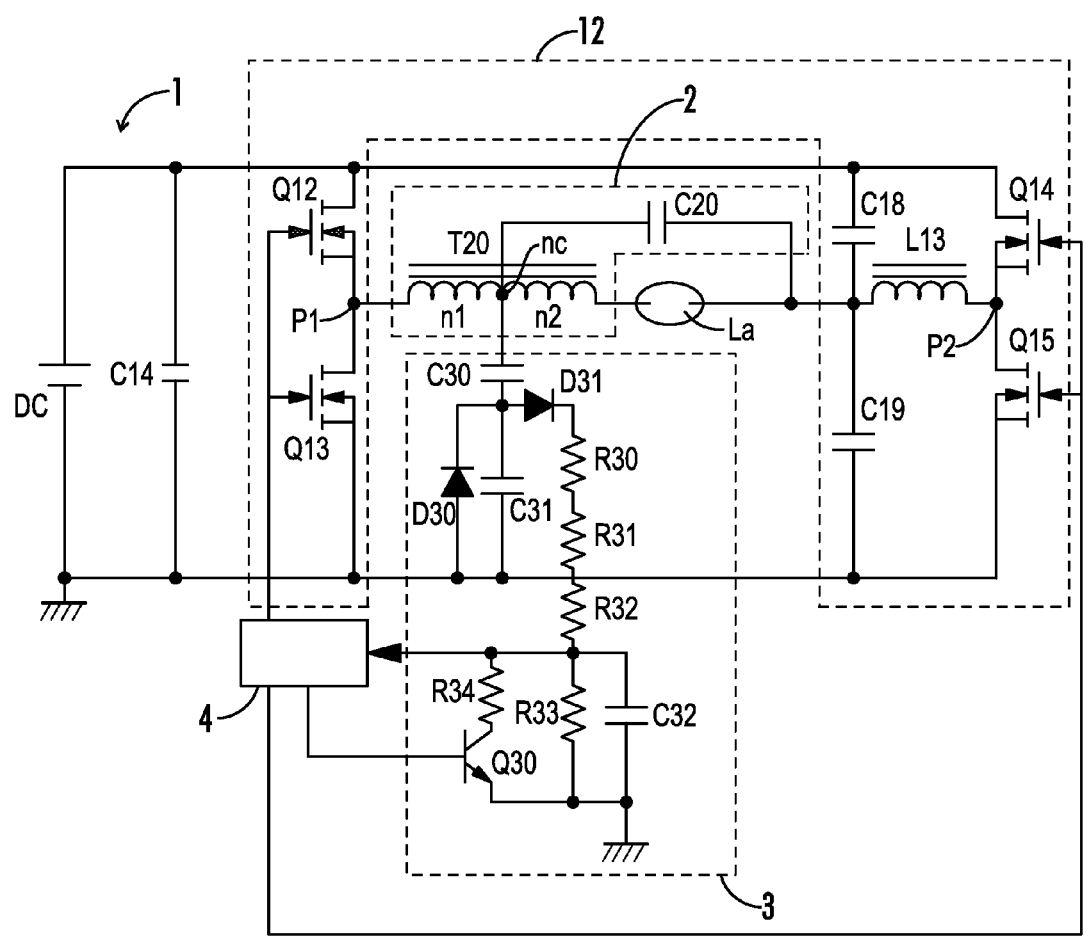
FIG. 6 is a circuit diagram showing another example of the discharge lamp ballast of FIG. 4.

Referring now to FIG. 6, in an embodiment the discharge lamp ballast includes a power supply circuit 1 that differs from previous embodiments in that a the step-down inductor L13, a first step-down capacitor C18 and a second step-down capacitor C19 are provided in place of the step-down converter circuit 11. The power supply circuit 1 does include the PFC circuit 10 and the inverter circuit 12. However, in FIG. 6, for simplification of illustration, the AC power source AC and the PFC circuit 10 are shown as the DC power source DC.

The inverter circuit 12 includes the four switches Q12 to Q15. Here, step-down inductor L13 is inserted between the output end P2 of the inverter circuit 12 and the electrode of the discharge lamp La (electrode electrically connected to the output end P2). The first step-down capacitor C18 is inserted between the connection point of the step-down inductor L13 and the discharge lamp La and the positive electrode of the DC power source DC, and the second step-down capacitor C19 is inserted between the connection point (connection point of the step-down inductor L13 and the discharge lamp La) and the negative electrode of the DC power source DC.

In other words, in the power supply circuit 1 in the present embodiment, the switches Q12 to Q15, the step-down inductor L13, the first and second step-down capacitors C18, C19 constitute the step-down chopper circuit.

Also in the discharge lamp ballast as shown in FIG. 6, in the steady-state mode, the control circuit 4 is configured so as to alternately perform the first control mode and the second control mode.

The power supply circuit 1 shown in FIG. 6 is, as described above, provided with the step-down inductor L13 and the first and second step-down capacitors C18, C19. For this reason, a voltage value of the rectangular wave voltage at the first control increases/decreases depending on the ON/OFF frequency of the switch Q15. On the other hand, a voltage value of the rectangular wave voltage at the second control increases/decreases depending on the ON/OFF frequency of the switch Q13. In other words, also in the power supply circuit 1 shown in FIG. 6, as in FIG. 4, part of the inverter circuit 12 (switches Q13, Q15) is also used as the step-down chopper circuit.

For this reason, because with the discharge lamp ballast shown in FIG. 6 there is no need to provide the step-down chopper circuit (step-down converter circuit 11) or the like separately from the inverter circuit 12, circuit scale can be reduced and further reduction of size and costs can be achieved.

Figure 7:
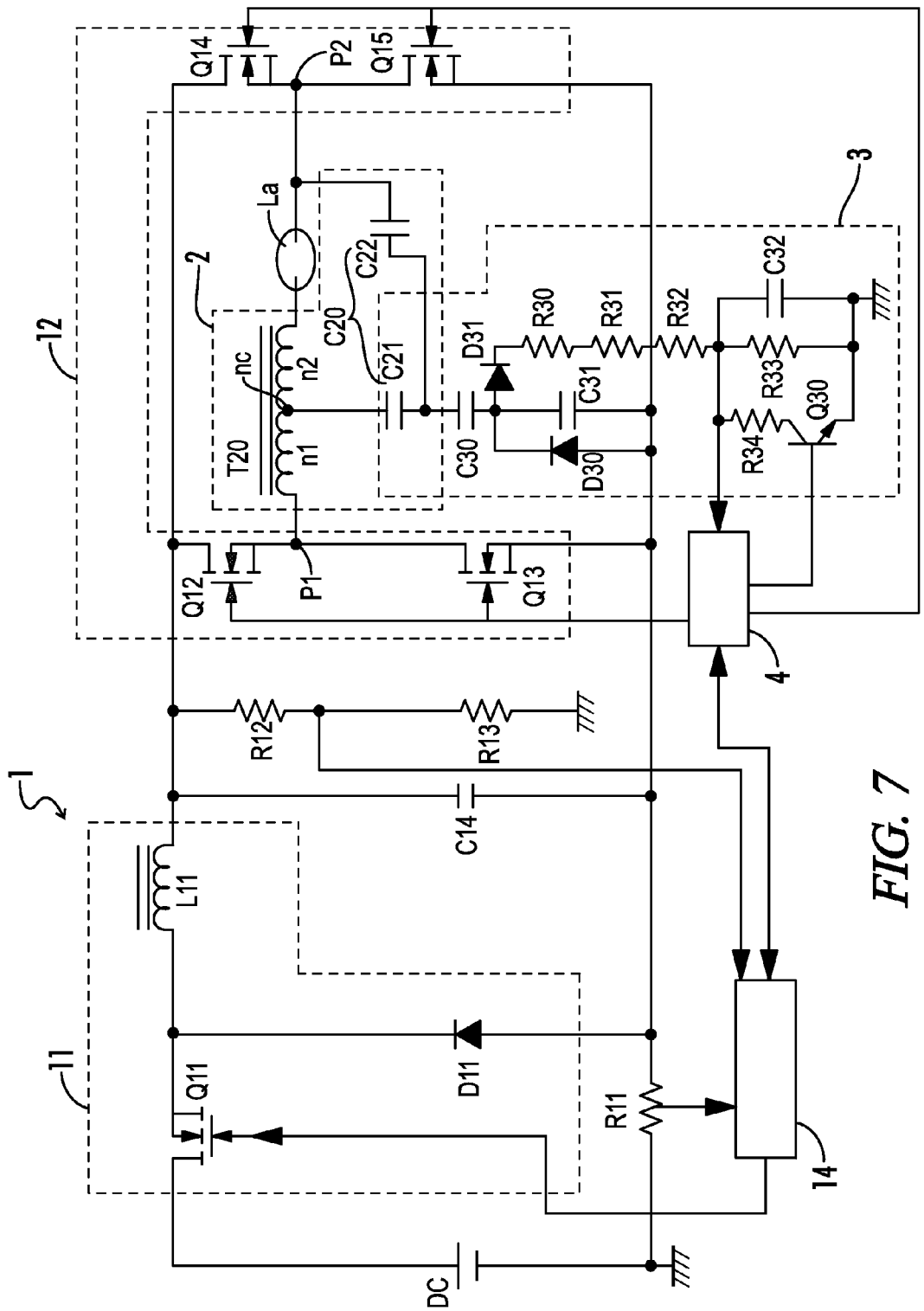
FIG. 7 is a circuit diagram showing another embodiment of a discharge lamp ballast of the present invention.

Referring now to FIG. 7, another embodiment of the discharge lamp ballast of the present invention may be described. The resonant circuit 2 in the present embodiment includes the resonant inductor T20 and the resonant capacitor C20. However, the resonant capacitor C20 in the present embodiment is a series circuit formed of a plurality of (two in the figure) capacitors C21, C22.

In the present embodiment, one end of the capacitor C30 of the voltage detection circuit 3 is connected between the capacitor C21 and the capacitor C22, not the intermediate tap nc. Thus, in the voltage detection circuit 3 in the present embodiment, the potential between the capacitor C21 and the capacitor C22 is detected as a potential of the resonant capacitor C20. In other words, the voltage detection circuit 3 detects the output voltage of the resonant circuit 2 based on the potential of at least one of the plurality of capacitors C21, C22.

Here, the potential between the capacitors C21, C22 is determined depending on the voltage between the both ends of the resonant capacitor C20 and electrostatic capacity of each of the capacitors C21, C22. For example, in the case where the turns ratio of the primary winding n1 to the secondary winding n2 in the resonant inductor T20 is 1:1, when the output voltage of the resonant circuit 2 is 3000 V, the voltage between the both ends of the resonant capacitor C20 becomes 1500V. At this time, when the ratio of the capacitor C21 to the capacitor C22 in electrostatic capacity is 1:1, the voltage across each of the capacitors C21, C22 becomes 750 V. For this reason, a potential detected by the voltage detection circuit 3 can be set to ¼ of the output voltage of the resonant circuit 2.

As described above, according to the discharge lamp ballast in the present embodiment, as compared to the case where the resonant capacitor C20 is formed of a single capacitor, the potential detected by the voltage detection circuit 3 can be further lowered. For this reason, the voltage detection circuit 3 having a lower voltage resistance can be adopted. Thus, further reduction of size and costs can be achieved.

Although the ratio of the capacitor C21 to the capacitor C22 in electrostatic capacity is 1:1 in the present embodiment, the ratio is not limited to 1:1. The resonant capacitor 20 may includes a series circuit formed of more capacitors than the two capacitors C21, C22. Various technical concepts as described in the present embodiment may also be applied to other embodiments of the present invention as may be understood by those of skill in the art.

Figure 8:
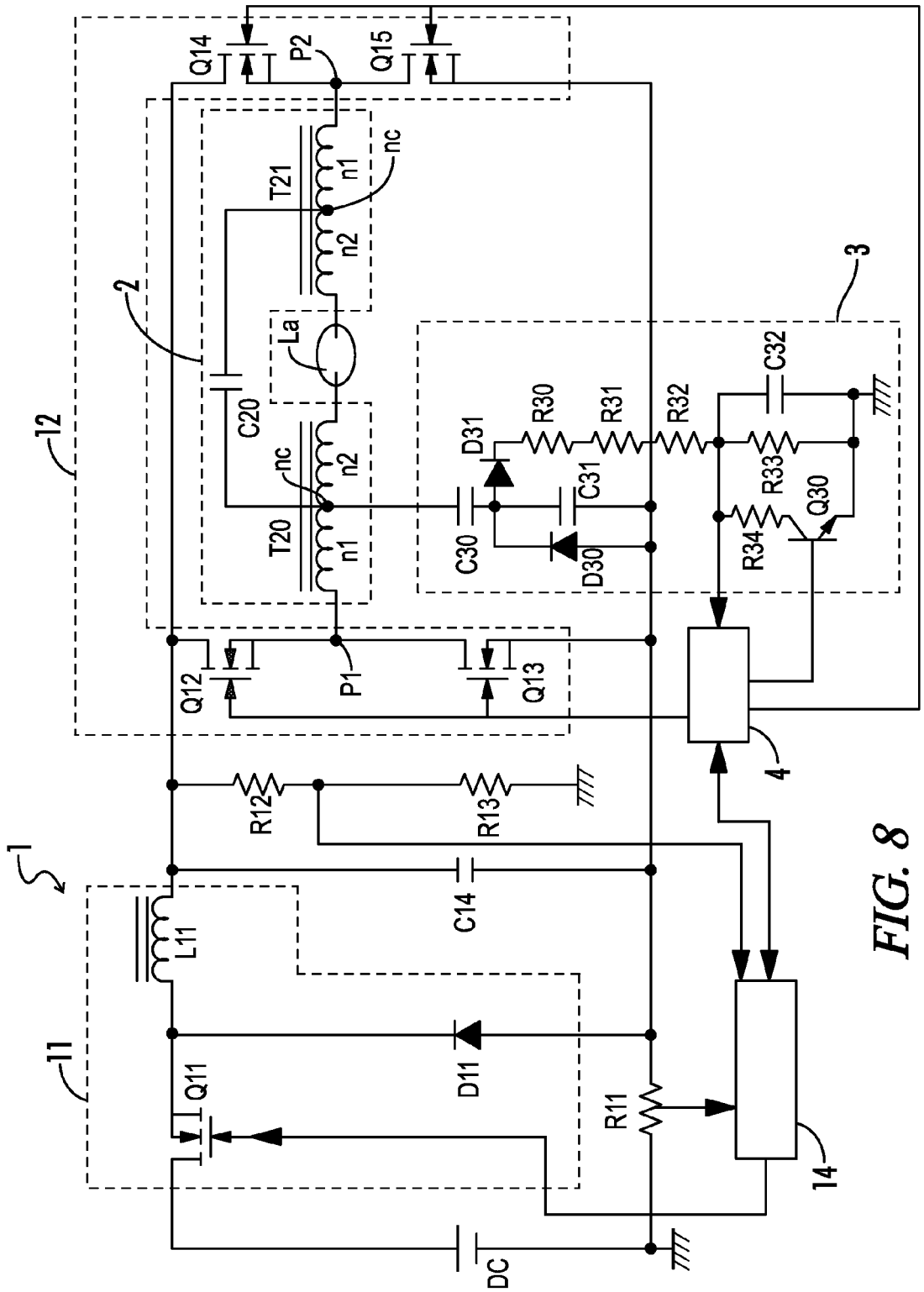
FIG. 8 is a circuit diagram showing another embodiment of a discharge lamp ballast of the present invention.
Figures 9, 9A:
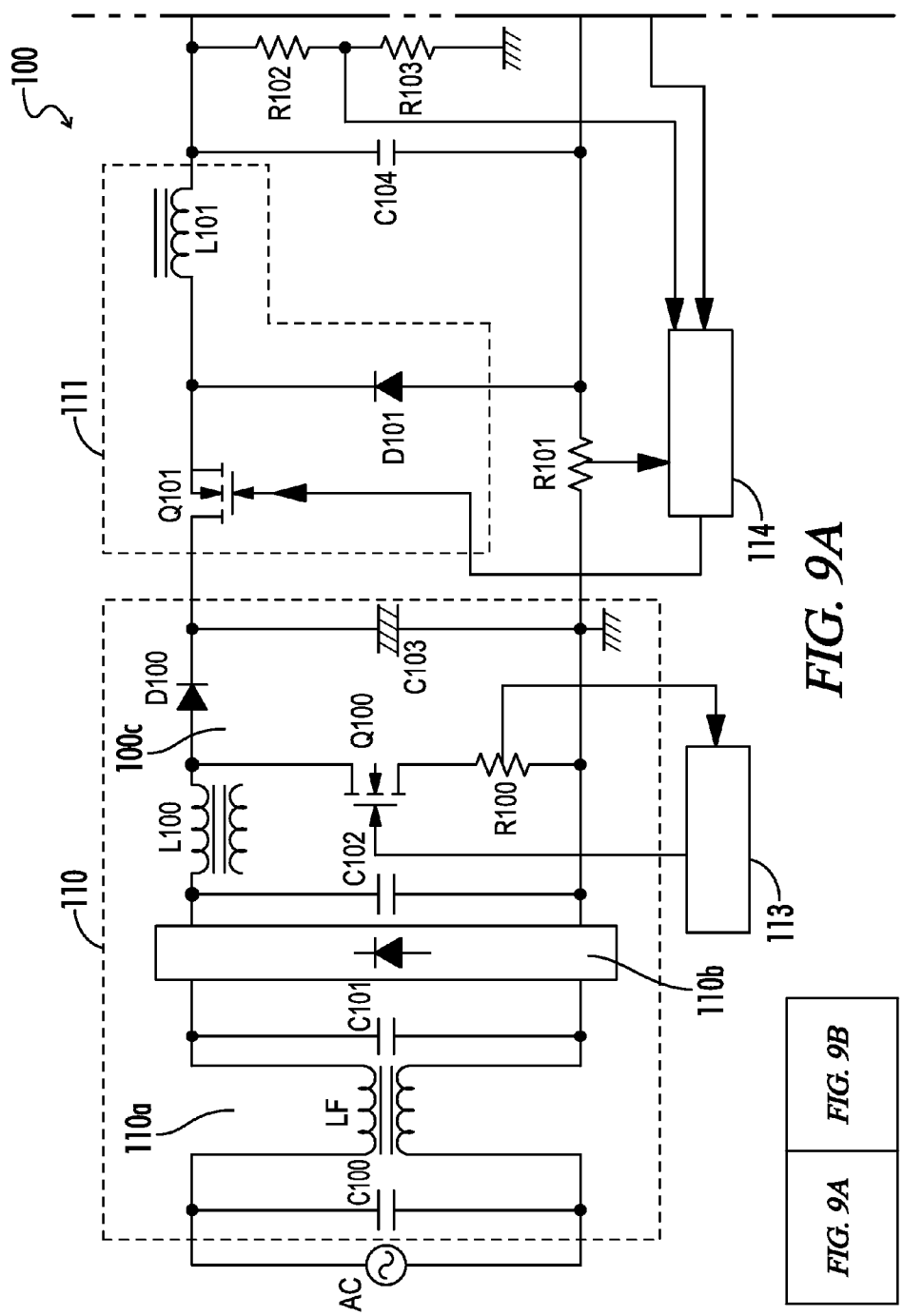
FIG. 9 is a circuit diagram of a discharge lamp ballast as conventionally known to one of skill in the art.
Figure 9B:
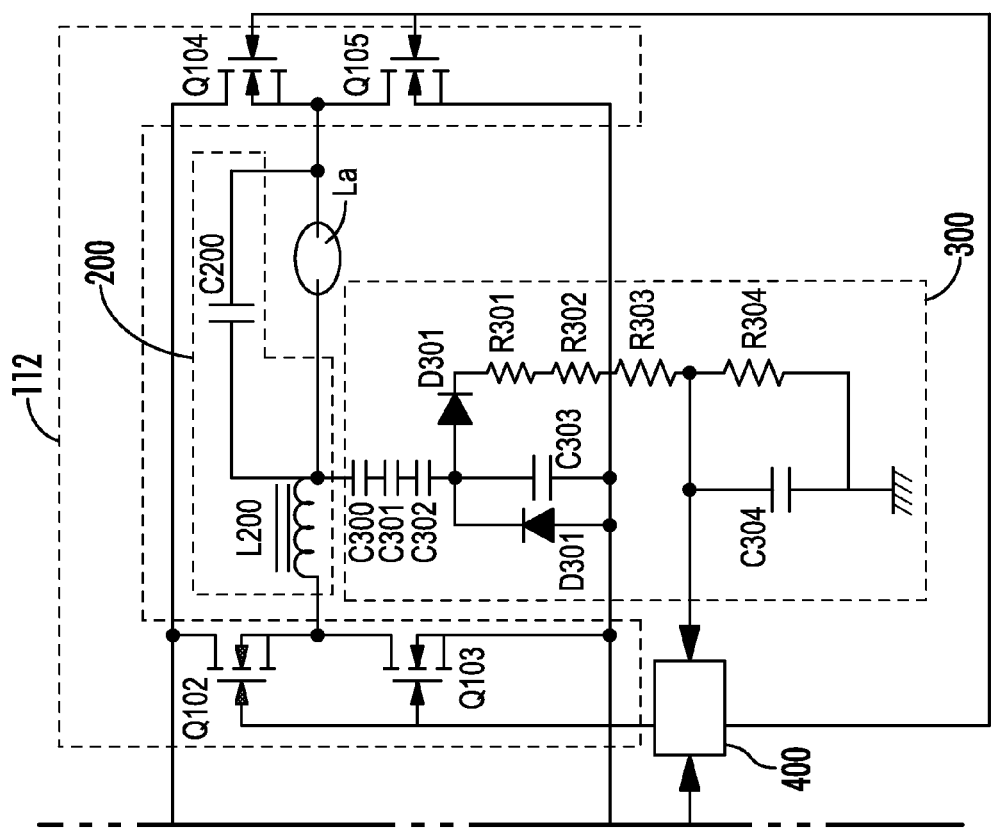

Referring now to FIG. 8, in another embodiment of the discharge lamp ballast, the resonant circuit 2 includes two resonant inductors T20, T21 and one resonant capacitor C20. One resonant inductor T20 is inserted between the first output end P1 of the inverter circuit 12 and one electrode of the discharge lamp La. The other resonant inductor T21 is inserted between the second output end P2 of the inverter circuit 12 and the other electrode of the discharge lamp La. Both of these resonant inductors T20, T21 are auto-transformers and, in each resonant inductor, the primary winding (shunt winding) n1 is serially connected to the secondary winding (series winding) n2. The intermediate tap nc is drawn from between the primary winding n1 and the secondary winding n2. The resonant capacitor C20 is inserted between the intermediate tap nc of the one resonant inductor T20 and the intermediate tap nc of the other resonant inductor T21.

In the resonant circuit 2 in the present embodiment, the primary windings n1 of the resonant inductors T20, T21 and the resonant capacitor C20 constitute the LC series resonant circuit. For this reason, the output voltage of the resonant circuit 2 in the present embodiment becomes equal to the voltage obtained by adding the voltage between the both ends of the resonant inductor T20 to the voltage between the both ends of the resonant inductor T21. The voltage between across each of the resonant inductors T20, T21 is equal to the voltage obtained by raising the voltage between both ends of the primary winding n1 according to the turns ratio of the primary winding n1 to the secondary winding n2 (that is, the turns ratio of the shunt winding to the series winding). For this reason, when the number of turns of the resonant inductor T20 is equal to that of the resonant inductor T21 and the turns ratio of the primary winding n1 to the secondary winding n2 is 1:1, an absolute value of the potential of the intermediate tap nc in the resonant inductor T20 becomes ¼ of the output voltage of the resonant circuit 2.

As described above, according to the discharge lamp ballast in the present embodiment, the potential detected by the voltage detection circuit 3 can be further lowered. For this reason, the voltage detection circuit 3 having a lower voltage resistance can be adopted. Thus, size and cost can be further reduced. Although the turns ratio of each of the resonant inductors T20, T21 is 1:1 in the present embodiment, the turns ratio is not limited to 1:1. Various technical concepts as described in the present embodiment may also be applied to other embodiments of the present invention as may be understood by those of skill in the art.

The discharge lamp ballast in various embodiments can be used in conjunction with a lighting fixture, such as for example a spotlight. Such a lighting fixture (not shown) includes the discharge lamp ballast of the present invention and a fixture main body (not shown) to which the discharge lamp La powered by the discharge lamp ballast is attached. According to such lighting fixtures, reduction in size and costs can be achieved while securing starting ability of the discharge lamp La.

The discharge lamp ballast can also be used for a projector. Such a projector (not shown) includes the discharge lamp ballast of the present invention and a projector main body (not shown) to which the discharge lamp La powered by the discharge lamp ballast is attached. According to such a projector, size and costs can be reduced while securing starting ability of the discharge lamp La.

Thus, although there have been described particular embodiments of the present invention of a new and useful Discharge Lamp Ballast, Lighting fixture and Projector Using the Same it is not intended that such references be construed as limitations upon the scope of this invention except as set forth in the following claims.

What is claimed is:

1. A discharge lamp ballast comprising:
   a power supply circuit further comprising an inverter circuit configured to convert a DC voltage obtained from a DC power source into a voltage having a determined frequency, and further configured to supply the converted voltage to a discharge lamp inserted between a pair of output ends of the inverter circuit;
   a resonant circuit further comprising an auto-transformer and a resonant capacitor, the resonant circuit configured for supplying an output voltage corresponding to a frequency of the converted voltage of the power supply circuit to the discharge lamp;
   a voltage detection circuit for detecting an output voltage of the resonant circuit based on a potential of the resonant capacitor; and
   a control circuit having a startup control mode wherein the control circuit is configured to determine the frequency of the converted voltage based on the detected voltage from the voltage detection circuit, wherein the output voltage of the resonant circuit exceeds a starting voltage of the discharge lamp.

2. The ballast of claim 1, the auto-transformer coupled between one output end of the inverter circuit and the discharge lamp, and the resonant capacitor coupled between an intermediate tap of the auto-transformer and the other end of the inverter circuit, and
   wherein the detected voltage across the resonant capacitor corresponds to the output voltage of the resonant circuit divided by the duty ratio of the auto-transformer.

3. The ballast of claim 2, wherein the control circuit in the startup mode sweeps the frequency of the converted voltage from the power supply circuit through a predetermined frequency range so that the frequency of the converted voltage approaches a target frequency.

4. The ballast of claim 3, wherein the target frequency is 1/(an odd number) of a resonant frequency of the resonant circuit.

5. The ballast of claim 3, wherein the target frequency is a resonant frequency of the resonant circuit.

6. The ballast of claim 3, the inverter circuit comprising two pairs of switches in a full bridge configuration, the control circuit further having a steady-state mode wherein the control circuit is configured after ignition of the discharge lamp to alternately switch on and off the pairs of switches at a relatively low frequency.

7. The ballast of claim 6, the control circuit in the steady-state mode configured to alternately switch on and off the switches from the first pair at a first relatively low frequency, and to alternately switch on and off a first switch from the second pair at a second relatively high frequency while a first switch from the first pair is on, and to alternately switch on and off a second switch from the second pair at the second relatively high frequency while a second switch from the first pair is on.

8. The ballast of claim 3, the inverter circuit comprising a pair of switches in a half-bridge configuration having a first output end for the inverter circuit, and further comprising a pair of capacitors coupled in parallel with the switches and having a second output end for the inverter circuit.

9. The ballast of claim 8, the control circuit further having a steady-state mode wherein the control circuit is configured after ignition of the discharge lamp to alternately switch on and off the pair of switches at a relatively low frequency.

10. A discharge lamp ballast comprising:
    a power supply circuit further comprising
      an inverter circuit configured to convert a DC voltage obtained from a DC power source into a voltage having a determined frequency, and to supply the converted voltage to a discharge lamp inserted between a pair of output ends of the inverter circuit,
      a step-down inductor coupled between a first output end of the inverter circuit and the discharge lamp, and
      a step-down capacitor coupled to a connection point of the step-down inductor and the discharge lamp;
    a resonant circuit for supplying an output voltage corresponding to a frequency of the voltage of the power supply circuit to the discharge lamp, the resonant circuit further comprising
      an auto-transformer coupled between the second output end of the inverter circuit and the discharge lamp, and
      a resonant capacitor coupled to an intermediate tap of the resonant inductor;
    a voltage detection circuit for detecting an output voltage of the resonant circuit based on a potential of the resonant capacitor; and
    a control circuit having a startup control mode wherein the control circuit is configured to determine the frequency of the rectangular wave voltage based on the detected voltage from the voltage detection circuit, wherein the output voltage of the resonant circuit exceeds a starting voltage of the discharge lamp.

11. The ballast of claim 10, the voltage detection circuit coupled to the intermediate tap of the auto-transformer, wherein the detected voltage across the resonant capacitor corresponds to the output voltage of the resonant circuit divided by the duty ratio of the auto-transformer.

12. The ballast of claim 11, wherein the control circuit in the startup mode sweeps the frequency of the converted voltage from the power supply circuit through a predetermined frequency range so that the frequency of the converted voltage approaches a target frequency.

13. The ballast of claim 11, wherein the target frequency is 1/(an odd number) of a resonant frequency of the resonant circuit.

14. The ballast of claim 11, wherein the target frequency is a resonant frequency of the resonant circuit.

15. The ballast of claim 10, the inverter circuit comprising two pairs of switches in a full bridge configuration, the control circuit further having a steady-state mode wherein the control circuit is configured after ignition of the discharge lamp to alternately switch on and off the pairs of switches at a relatively low frequency.

16. The ballast of claim 15, the control circuit in the steady-state mode configured to alternately switch on and off the switches from the first pair at a first relatively low frequency, and to alternately switch on and off a first switch from the second pair at a second relatively high frequency while a first switch from the first pair is on, and to alternately switch on and off a second switch from the second pair at the second relatively high frequency while a second switch from the first pair is on.

17. The ballast of claim 15, comprising a pair of step-down capacitors coupled in series between the positive and negative terminals of the DC power source, a connection point of the pair of step-down capacitors further coupled between the step-down inductor and the discharge lamp.

18. A discharge lamp ballast comprising:
an inverter circuit having two pairs of switches arranged in a full bridge configuration for converting a DC voltage obtained from a DC power source into a voltage having a determined frequency, the inverter circuit further arranged to supply the converted voltage to a discharge lamp coupled between a pair of output ends located between the pairs of switches;
a resonant circuit comprising an auto-transformer and a resonant capacitor, the auto-transformer coupled between a first output end of the inverter circuit and the discharge lamp, and the resonant capacitor coupled to an intermediate tap of the auto-transformer, the resonant circuit configured to supply an output voltage corresponding to the determined frequency of the converted voltage of the power supply circuit to the discharge lamp;
a voltage detection circuit coupled to the intermediate tap of the auto-transformer for detecting an output voltage of the resonant circuit; and
a control circuit having
a startup control mode wherein the control circuit is configured to sweep the frequency of the converted voltage from the power supply circuit through a predetermined frequency range so that the frequency of the converted voltage approaches a target frequency, wherein the output voltage of the resonant circuit exceeds a starting voltage of the discharge lamp, and
a steady-state mode wherein the control circuit is configured after ignition of the discharge lamp to alternately switch on and off the pairs of switches in the inverter circuit at a low frequency relative to the determined frequency of the startup control mode.

19. The ballast of claim 18, wherein the target frequency is 1/(an odd number) of a resonant frequency of the resonant circuit.

20. The ballast of claim 18, wherein the target frequency is a resonant frequency of the resonant circuit.

21. The ballast of claim 18, wherein the resonant capacitor includes a series circuit formed of a plurality of capacitors; and
the voltage detection circuit detects the output voltage based on a potential of one of the plurality of capacitors.

22. The ballast of claim 18, the resonant circuit comprising
a first auto-transformer coupled between a first output end of the inverter circuit and a first end of the discharge lamp,
a second auto-transformer coupled between a second output end of the inverter circuit and a second end of the discharge lamp, and
the resonant capacitor coupled to an intermediate tap of the first auto-transformer and an intermediate tap of the second auto-transformer.

* * * * *